US007624420B2

(12) United States Patent
Miyagawa

(10) Patent No.: US 7,624,420 B2
(45) Date of Patent: Nov. 24, 2009

(54) DIGITAL TELEVISION BROADCAST SIGNAL RECEIVER

(75) Inventor: Tatsuo Miyagawa, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 667 days.

(21) Appl. No.: 11/187,011

(22) Filed: Jul. 22, 2005

(65) Prior Publication Data
US 2006/0020978 A1 Jan. 26, 2006

(30) Foreign Application Priority Data
Jul. 23, 2004 (JP) ............................. 2004-216440

(51) Int. Cl.
*H04N 7/16* (2006.01)
*H04N 7/20* (2006.01)
(52) U.S. Cl. ..................... 725/151; 725/72; 348/731; 348/706; 348/570; 348/725
(58) Field of Classification Search ............. 725/72, 725/151; 348/731
See application file for complete search history.

(56) References Cited

U.S. PATENT DOCUMENTS

| 6,334,218 | B1 * | 12/2001 | Jeong et al. ................... 725/72 |
| 6,982,745 | B2 * | 1/2006 | Miyabayashi ............... 348/193 |
| 2003/0005447 | A1 * | 1/2003 | Rodriguez .................... 725/51 |
| 2004/0128689 | A1 * | 7/2004 | Pugel et al. ................... 725/72 |
| 2004/0166811 | A1 * | 8/2004 | Moon ...................... 455/67.11 |
| 2004/0183911 | A1 * | 9/2004 | Lee ............................. 348/192 |
| 2004/0196204 | A1 * | 10/2004 | Shirosaka et al. ........... 343/853 |
| 2006/0050005 | A1 * | 3/2006 | Shirosaka et al. ........... 343/844 |

FOREIGN PATENT DOCUMENTS

| JP | 2002-320165 A | 10/2002 |
| JP | 2003-101897 A | 4/2003 |
| JP | 2003-234663 A | 8/2003 |

* cited by examiner

*Primary Examiner*—Andrew Y Koenig
*Assistant Examiner*—Ricky Chin
(74) *Attorney, Agent, or Firm*—Crowell & Moring LLP

(57) ABSTRACT

A digital television broadcast signal receiver connected to a multi-directional antenna carries out in advance automatic scanning for each channel to determine and store the strength of a signal received in each of multiple receiving directions of the antenna, a best receiving direction, and a maximum value of the received signal strengths, normalize the received signal strengths measured in the respective directions with respect to the maximum received signal strength, and produce and store an antenna direction level pattern including a bar graph that shows the received signal strengths in the respective directions with the normalized values used as the amplitude. In response to a command from a user, the receiver superimposes the level pattern on a video image being received for display on a display screen, so that a user can select a receiving direction on the screen. When image degradation takes place during signal reception by the antenna having been already adjusted in orientation, a user can manually reorient the antenna so as to quickly improve the receiving condition without the need for additional time-consuming automatic scanning for adjustment of the orientation of the antenna.

8 Claims, 6 Drawing Sheets

DIGITAL TELEVISION BROADCAST SIGNAL RECEIVER

BACKGROUND OF THE INVENTION

1. Field of the Invention

The present invention relates to a digital television broadcast signal receiver for receiving a digital television signal such as an Advanced Television Systems Committee (ATSC) signal.

2. Description of the Related Art

In the North America where ATSC digital television broadcast (hereinafter referred to as TV broadcast) is provided, television signals are transmitted from variously located broadcast stations at big cities or their suburbs in the plains. From the viewpoint of a user who receives such TV broadcast, television signals come from various directions. Accordingly, it is necessary for a user to adjust the orientation of an antenna so as to aim the antenna at a broadcast station transmitting a desired TV program. For this purpose, multi-directional antennas such as smart antennas are put into practical use.

The Electronic Industries Association (EIA)-909 standard provides that a smart antenna has sixteen receiving directions corresponding to the respective directions by which a circle is divided into sixteen. Various types of multi-directional antennas or smart antennas are commercially available. For example, a multi-directional antenna is known that is configured to rotate with a motor so as to change its active receiving direction. Another multi-directional antenna is known that includes a plurality of antenna units pointing in different directions and electronic switches, and makes one of the antenna directions active by turning on and off the electronic switches (without rotation of the antenna itself).

Some of television broadcast signal receivers to be connected to such a multi-directional antenna as described above are designed to be capable of automatically adjusting the orientation of a multi-directional antenna. On the other hand, in the case where such an antenna is placed in a room for example, the receiving condition tends to frequently change. Therefore, it is also needed to allow a user to know the current receiving condition.

There are known methods of displaying the receiving condition of an antenna by on-screen display function. For example, Japanese laid-open patent publication 2002-320165 discloses a method of receiving signals on a channel by one of a plurality of tuners while receiving signals on other channels by another one of the tuners to determine and store receiving conditions for the respective channels and displaying the stored receiving conditions in list form as the need arises. Japanese laid-open patent publication 2003-101897 discloses a method of displaying together the received signal strengths of two or more kinds of signals transmitted in different ways without the need to switch into a mode for receiving each kind of signals. Japanese laid-open patent publication 2003-234663 discloses a method of measuring the levels of signals received from two satellites and displaying the measured signal levels in the form of a horizontal bar graph on the screen.

As described above, the ATSC digital broadcasting in the U.S.A. may cause television signals to come from every direction. In order to receive such television signals, a multi-directional antenna such as a smart antenna is needed as well as a digital television broadcast signal receiver (hereinafter, abbreviated as a digital TV broadcast signal receiver) conforming to the EIA-909 standard that is configured to be capable of switching an active receiving direction of the multi-directional antenna to any one of the sixteen directions.

Since the position of an antenna at a broadcast station or transmission tower does not change generally, a digital TV broadcast signal receiver can scan the sixteen directions for each channel to set one of the directions in which TV signals on each channel can be received in the best condition as a best receiving direction for the channel. Some of digital TV broadcast signal receivers have an automatic scanning function for selecting a receiving direction of an antenna in which TV signals on a user-selected channel can be best received.

A conventional digital TV broadcast signal receiver is configured to, in initial setting of a multi-directional antenna or smart antenna, take time to scan all the directions for each channel to determine a best direction for reception of signals on each channel and a maximum value of received signal strengths on each channel. The conventional digital TV broadcast signal receiver then stores the best receiving direction and the maximum received signal strength in a memory provided therein so that, when a channel is selected by a user, the antenna can be promptly oriented to receive signals on the selected channel based on the stored data. However, when displayed video images are somewhat degraded during signal reception, a user may desire to manually change the orientation of the antenna to obtain better quality images. In such a case, the conventional digital TV broadcast signal receiver does not allow a user to easily change the orientation of the antenna but requires another automatic scanning, which is time consuming. In addition, there are cases where image quality is degraded while the orientation of the antenna should be appropriate under normal circumstances without any interference. For example, image quality may be degraded due to interference signals or ghosts during signal reception while the received signal level is not low. Further, in the case where an indoor antenna is used, image quality may be degraded every time a car passes outdoors. In such a case, even when the antenna is reoriented through another scanning, the receiving condition often remains not improved while much time is spent in the scanning.

In the above case where signal reception is in poor condition or interference signals or ghosts are present, there is a possibility that image quality can be improved or the interference signals or ghosts can be avoided or reduced by orienting the antenna in another direction in which the received signal level is equivalent to that in the original position, if any.

In the above described cases, it is convenient if a user is allowed to readily change the orientation of the antenna. In order to manually reorient the antenna in such a case, a technique is needed that informs a user of precise position of the antenna while the antenna is rotated, i.e., allows a user to reorient the antenna while checking how much the antenna is rotated with consideration given to a case where the antenna is to be returned to the original position.

SUMMARY OF THE INVENTION

An object of the present invention is to provide a digital TV broadcast signal receiver that, when a TV image degrades during signal reception or when interference signals or ghosts appear on a display screen, allows a user to manually reorient an antenna by selecting a receiving direction on the screen in a visual and easy way using a remote controller, and further allows a user to select a receiving direction while checking video images being received in a current receiving direction so as to select a channel with higher image quality and less interference.

According to an aspect of the present invention, a digital television broadcast signal receiver configured to be connected to a multi-directional antenna having multiple receiving directions in conformity to a standard so as to receive television signals on a channel that are transmitted from a broadcast station by making only one of the multiple receiving directions active, comprises: a receiving direction control signal output unit for outputting, to the multi-directional antenna, a control signal specifying a receiving direction for reception of a television signal; a tuner configured to be connected to the multi-directional antenna for receiving a television signal; a broadcast signal processing unit for subjecting the television signal received by the tuner to predetermined signal processing; an image signal output unit for outputting the signal processed by the broadcast signal processing unit to a monitor; a memory for temporarily storing the signal processed by the broadcast signal processing unit; a receiving direction determining unit for determining a best receiving direction for each receivable channel based on the signal stored in the memory; a signal level display unit for displaying a received signal strength based on the signal stored in the memory; and a main controller for entirely controlling an action of the digital television broadcast signal receiver.

The receiving direction control signal output unit sends the control signal to the multi-directional antenna at predetermined intervals so that the multi-directional antenna is sequentially oriented in the multiple receiving directions.

The tuner measures, for each channel, a strength of a television signal received in each of the multiple receiving directions in sequence and stores in the memory, for the each channel, the received signal strength measured in each of the receiving directions, a best receiving direction in which a received signal has maximum strength, and a maximum received signal strength measured in the best receiving direction.

The signal level display unit produces a pattern showing the received signal strength measured in each of the receiving directions that is stored in the memory and displays the produced pattern on a television screen.

According to the aspect of the present invention, a user can know a current receiving condition visually and easily. Thus, a user can quickly check the current antenna direction and reorients the antenna when it is judged that direction change is needed.

Preferably, the signal level display unit normalizes, with respect to the maximum received signal strength, the received signal strength that is measured in each of the receiving directions and stored in the memory, produces an antenna direction level pattern including a circle graph in which the normalized signal strength associated with a receiving direction number arranged at a circumference of the circle graph for representing each of the receiving directions is shown with an amplitude in a radial direction, and displays the antenna direction level pattern on the television screen so that a user can reorient the multi-directional antenna by selecting one of the receiving direction numbers displayed on the television screen using a remote controller.

By such a configuration, a user can change the orientation of the antenna manually and freely by selecting one of the multiple receiving directions of the antenna using a remote controller while checking the pattern displayed on the screen that shows which direction allows high level signal reception as well as the image quality of a video image received in an active receiving direction. Thereby, a user can easily select in real time a direction in which a higher quality image can be obtained without scanning by the antenna. Accordingly, even when the signal-to-noise (S/N) ratio becomes lower or when interference signals or ghosts appear on a television screen, a user can readily select another antenna direction in which TV signals can be received with a higher S/N ratio and less interference so as to enjoy a TV image of higher image quality. Further, the antenna direction level pattern is displayed with the receiving direction numbers, which correspond to the respective actual receiving directions of the multi-directional antenna or smart antenna, arranged at the circumference of the circle graph in the pattern so as to be easily understandable. Thus, a user interface friendly even to a child or an elderly person can be provided that allows a user to easily control the receiver using the remote controller while viewing the pattern on the screen.

Preferably, when the antenna direction level pattern is superimposed on a video image of a television program being received for display, the image signal output unit causes the video image of the television program being received to be displayed as a reduced-size picture together with the antenna direction level pattern.

By such a configuration, a user can select a receiving direction of the antenna while watching the whole of a video image being actually received to check the image quality. Accordingly, an antenna direction allowing reception of a TV image of better image quality can be selected more properly.

Preferably, the signal level display unit determines a reference signal level allowing display of a received image, normalizes the reference signal level with respect to the maximum received signal strength for the each channel, and displays the normalized reference signal level concentrically on the circle graph in the antenna direction level pattern.

By such a configuration, since the reference signal level required for normal reception is displayed concentrically, a user can compare the received signal strengths referring to the reference signal level and select a receiving direction in which the received signal strength exceeds the reference level, whereby normally received images can be obtained reliably.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein.

DESCRIPTION OF THE PREFERRED EMBODIMENTS

Figure 1:
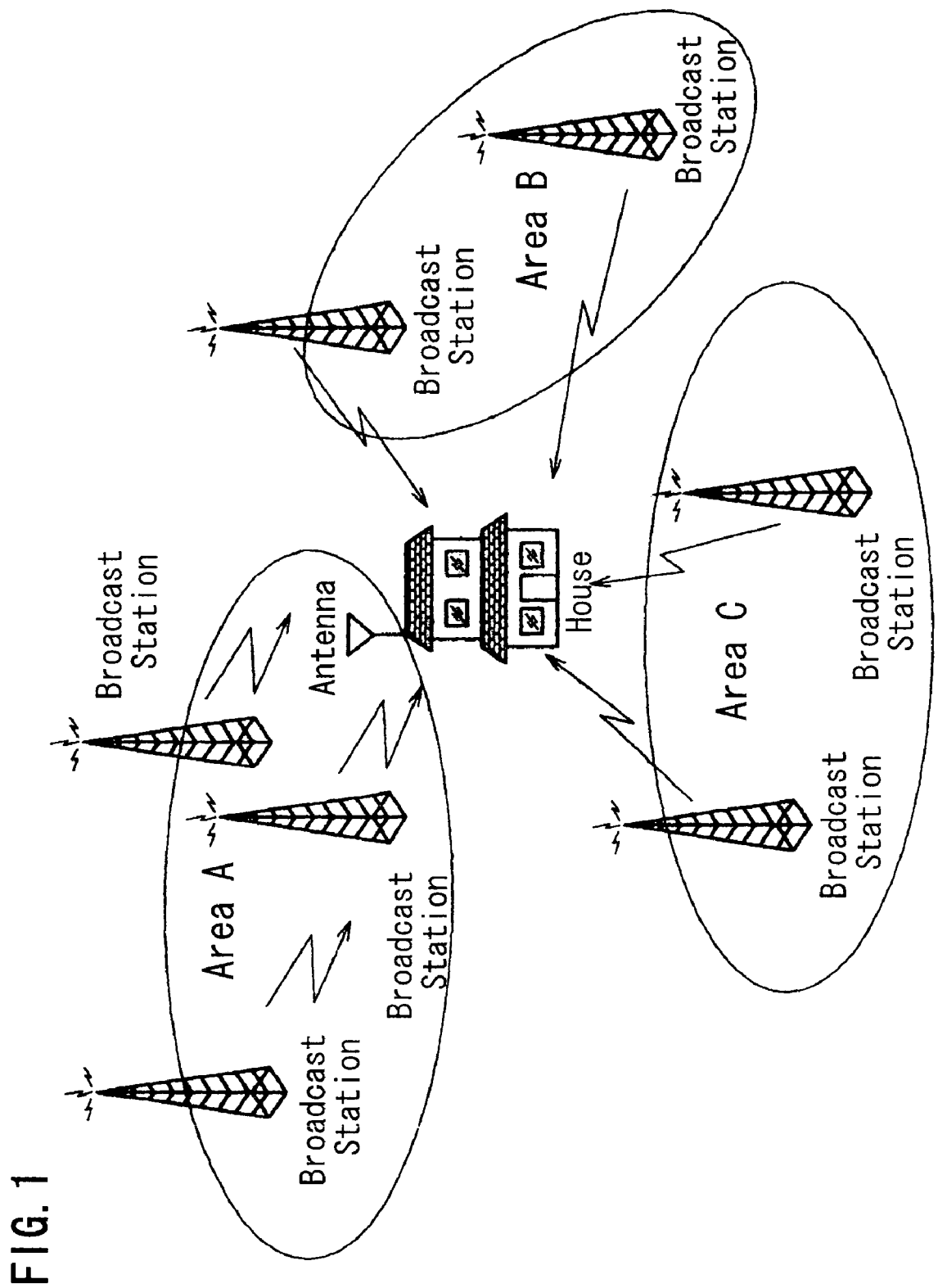
FIG. 1 is a conceptual illustration of a situation in which a user at home receives digital TV signals.

Referring now to the accompanying drawings, a digital TV broadcast signal receiver embodying the present invention is described. FIG. 1 shows a situation in which a user receives TV signals at home. In an area where digital (terrestrial) TV broadcast is provided, images of a certain quality can be obtained through error correction and the like as long as the strength of a received digital TV signal is equal to or higher than a predetermined threshold value. Accordingly, as shown in FIG. 1, it is possible for a user to receive TV signals transmitted from broadcast stations located at multiple areas, e.g., area A, area B, and area C so as to view TV programs provided by the broadcast stations. For this situation, a multi-directional antenna having multiple receiving directions, which is called a smart antenna, is in practical use.

A digital TV broadcast signal receiver can receive not only digital TV signals but also analog TV signals. When receiving either digital or analog TV signals, the digital TV broadcast signal receiver can identify the number of receiving directions of a multi-directional antenna connected thereto to effectively and optimally control selection of a receiving direction. Thus, digital TV signals and analog TV signals are both referred to simply as TV signals, where it is not necessary to distinguish them from each other.

According to the EIA-909 standard, a digital TV broadcast signal receiver is required to be capable of switching between all the sixteen directions regardless of the type of a multi-directional antenna to be connected or the number of receiving directions of the antenna.

When connected to a multi-directional antenna, the digital TV broadcast signal receiver according to this embodiment receives a TV signal in each of the sixteen directions defined in the standard and measures the received signal strength. Then, the digital TV broadcast signal receiver stores a best direction, for each receivable channel, in which the received signal has maximum strength so as to orient the multi-directional antenna in the best direction upon selection of a channel.

Figure 2:
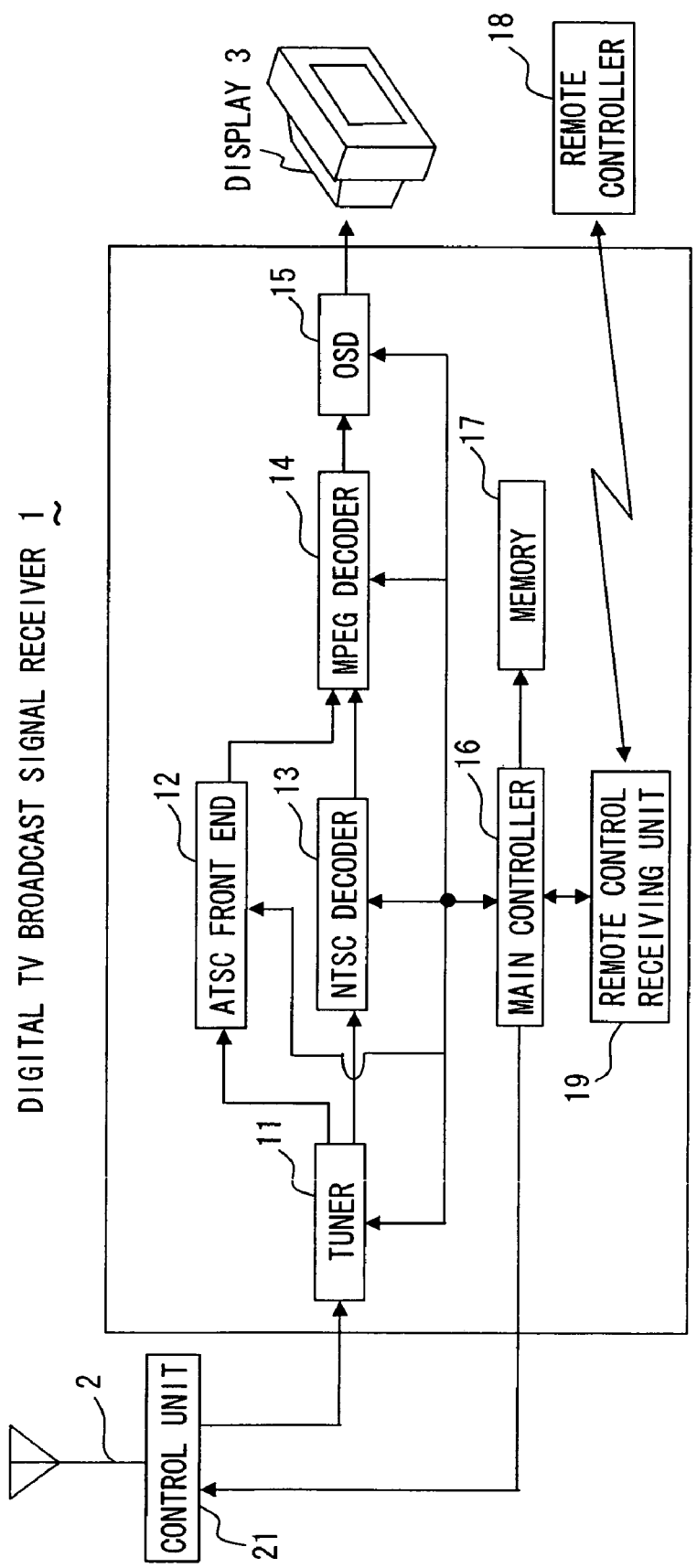
FIG. 2 is an electrical block diagram of a digital TV broadcast signal receiver embodying the present invention.

FIG. 2 is a block diagram of the digital TV broadcast signal receiver 1 according to this embodiment. The digital TV broadcast signal receiver 1 is configured to be connected to a multi-directional antenna 2, and comprises a tuner 11 for receiving a TV signal, an ATSC front end (broadcast signal processing unit) 12 for subjecting a digital TV signal received by the tuner 11 to predetermined signal processing to decode the digital TV signal, an NTSC decoder (broadcast signal processing unit) 13 for decoding an analog TV signal received by the tuner 11, an MPEG decoder (image signal output unit) 14 for decoding an MPEG-compressed TV signal, an on-screen display (OSD) 15 for superimposing predetermined display image data on a decoded TV signal, a main controller (CPU) 16 for instructing the tuner 11 to measure the strength of a received TV signal, controlling the action of a control unit 21 for the multi-directional antenna 2, and controlling the actions of e.g. the ATSC front end 12 and the NTSC decoder 13, a memory 17 for temporarily storing a decoded TV signal and storing the display image data to be superimposed on a decoded TV signal, a remote controller 18 for remotely controlling the digital TV broadcast signal receiver 1, and a remote control receiving unit 19 for receiving a control signal from the remote controller 18. The TV signal decoded by the MPEG decoder 14 is transferred via the on-screen display (image signal output unit) 15 to a monitor 3 for display. The broadcast signal processing unit herein comprises the ATSC front end 12, the NTSC decoder 13, and the MPEG decoder 14. As described below, the main controller 16 serves not only as a receiving direction determining unit, a receiving direction control signal output unit, and a signal level display unit but also as an entire controller for controlling the actions of respective components in the receiver that include the broadcast signal processing unit. The receiving direction control signal output unit includes a receiving direction control unit. Generally in the digital TV broadcasting, the digital TV broadcast signal receiver 1 on user side can transmit data to a broadcast station, but it is not directly related to the present invention and will be described in no more detail.

In response to a control signal from the main controller 16, the control unit 21 for the multi-directional antenna 2 causes only one receiving direction, which is specified by the control signal, among the multiple receiving directions of the multi-directional antenna 2 to be active. In the case where the multi-directional antenna 2 is of the type that rotates with a motor for changing the active receiving direction, the control unit 21 controls rotation of the motor to orient the antenna in the specified direction. On the other hand, in the case where the multi-directional antenna 2 is of the type that makes one of the antenna directions active by turning on and off the electronic switches, the control unit 21 turns on only one of the electronic switches that is connected to an antenna unit pointing in the specified direction while turning off the other electronic switches.

Figure 3:
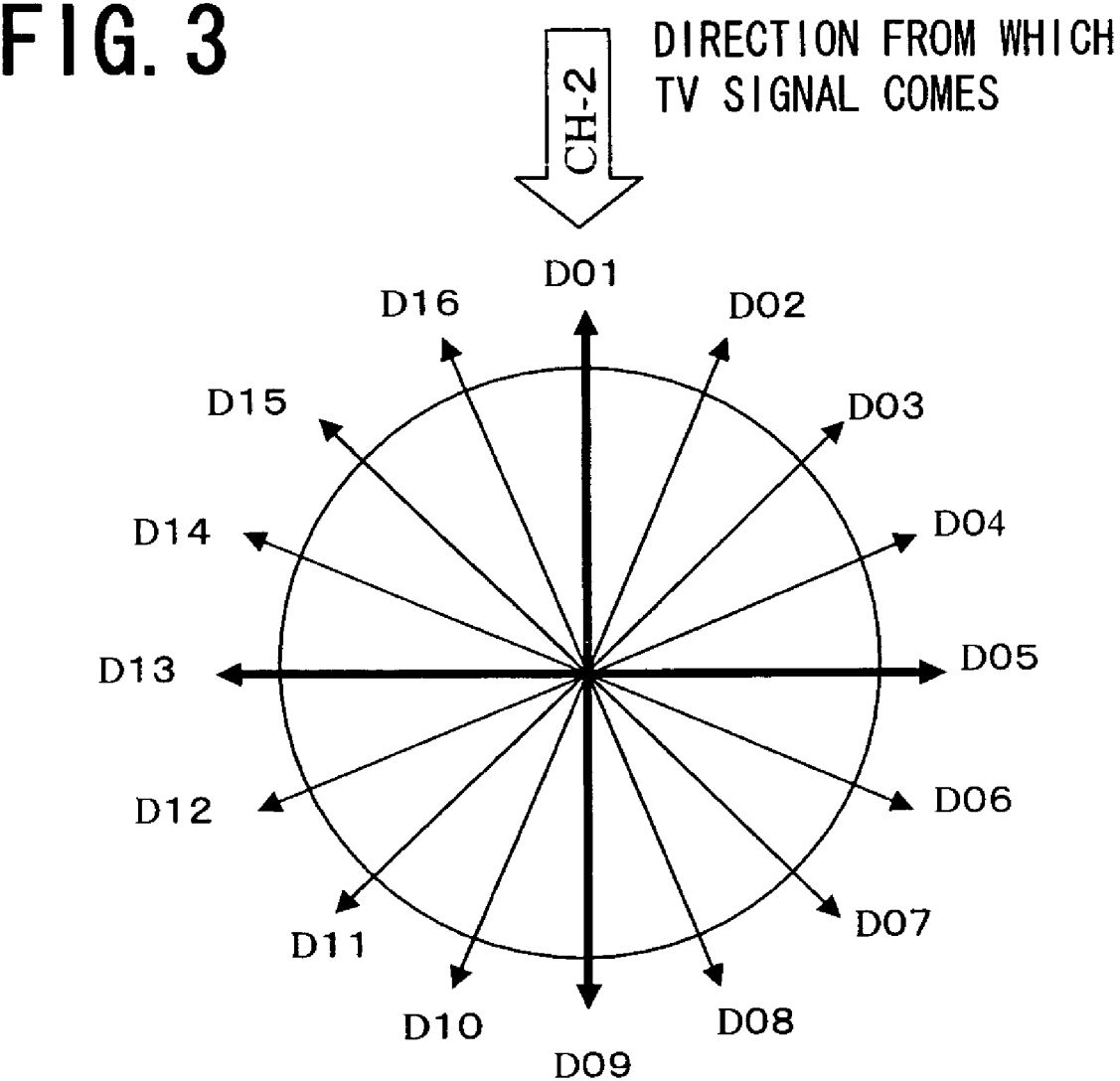
FIG. 3 is a diagram showing an example of reception of TV signals using an antenna having multiple receiving directions.

FIG. 3 illustrates an example of TV signal reception using the multi-directional antenna 2 or smart antenna having sixteen receiving directions in conformity to the EIA-909 standard. The sixteen receiving directions defined by the EIA-909 standard are indicated by D01 to D16, respectively, in FIG. 3. The direction from which a TV signal on a channel comes is indicated, as an example, by a wide arrow with a channel number "CH-2" ("CH" is abbreviation of "channel").

Figure 4:
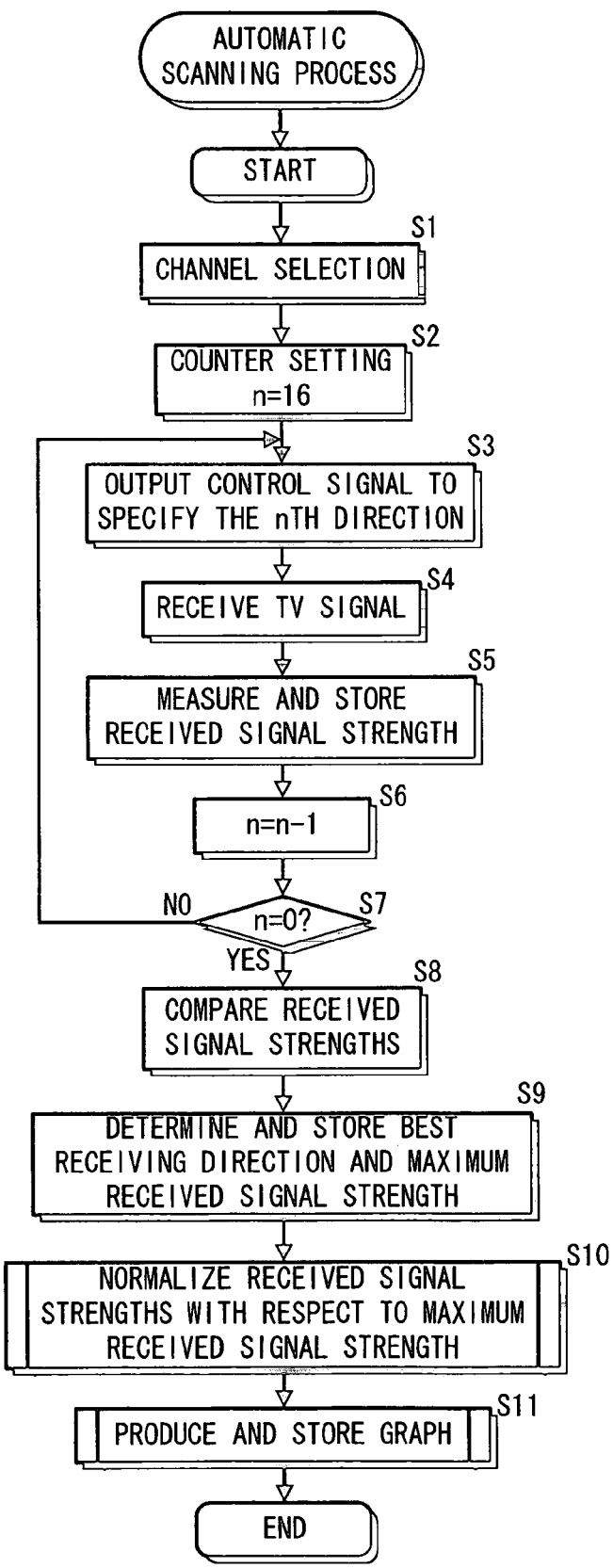
FIG. 4 is a flowchart showing an automatic scanning process executed by the digital TV broadcast signal receiver.

Referring now to the flowchart shown in FIG. 4, an automatic scanning process is described that is executed by the main controller 16 in the digital TV broadcast signal receiver 1 to determine a best receiving direction of the multi-directional antenna 2. As shown in FIG. 4, the main controller 16 starts the automatic scanning process when detecting the multi-directional antenna 2 connected to the tuner 11. In response to selection of a channel (S1), the main controller 16 sets a counter at n=16 (S2) and outputs a control signal specifying the $n_{th}$ direction to the control unit 21 for the multi-directional antenna 2 (S3). After a period of time required for changing the active receiving direction of the multi-directional antenna 2, the main controller 16 instructs the tuner 11 to receive a TV signal on the selected channel (S4). When the TV signal is received, the main controller 16 instructs the tuner 11 to measure the strength of the received TV signal, and stores the measurement in the memory 17 (S5). Then, the main controller 16 decrements the counter by one (S6) and thereafter determines whether or not the strengths of digital TV signals received in all the sixteen receiving directions have been measured (S7). When measurement of the received digital TV signal strength has not been carried out for all the sixteen receiving directions yet (NO at S7), the process returns to the step S3 for measurement of the strength of a digital TV signal received in a next receiving direction.

When the measurement of the received signal strength has been completed for all the sixteen directions (YES at S7), the main controller 16 reads out the measurements or received signal strengths from the memory 17 and compares them with each other (S8). The main controller 16 then determines and stores a best receiving direction in which a received signal on the selected channel has maximum strength as well as the maximum received signal strength measured in the best receiving direction (S9). Then, the main controller 16 normalizes a received signal strength En measured in another one of the receiving directions with respect to the maximum received signal strength Emax measured in the best receiving direction (S10) to produce a bar graph in which, with the normalized value used as the amplitude, each bar extends radially from the center of a circle toward each of the sixteen direction numbers D01 to D16 arranged at the circumference of the circle at equal intervals, and store the bar graph as an antenna direction level pattern in the memory 17 (S11). The sixteen direction numbers correspond to the actual antenna directions, respectively, shown in FIG. 3. Each of the bars in the bar graph is formed by stacking rectangles up to a level on the pattern that corresponds to the signal strength En. The colors of the stacked rectangles vary depending on the levels so that the received signal strengths can be recognized at a glance. Then, the main controller 16 determines a reference level of received signal strength that allows reproduction of a video image and normalizes it in the same way for storage, whereby the process exits. By displaying the normalized reference signal level concentrically on the graph, the received signal strength can be compared with the reference signal level to judge whether or not the received signal strength is acceptable for image display. If the maximum received signal strength is lower than the reference signal level, the normalized reference signal level exceeds one and thus goes over the circumference of the graph, so that it is not displayed. In other words, in the case where the normalized reference signal level is not shown on the graph, it can be judged that the received signals are too weak.

Figure 5:
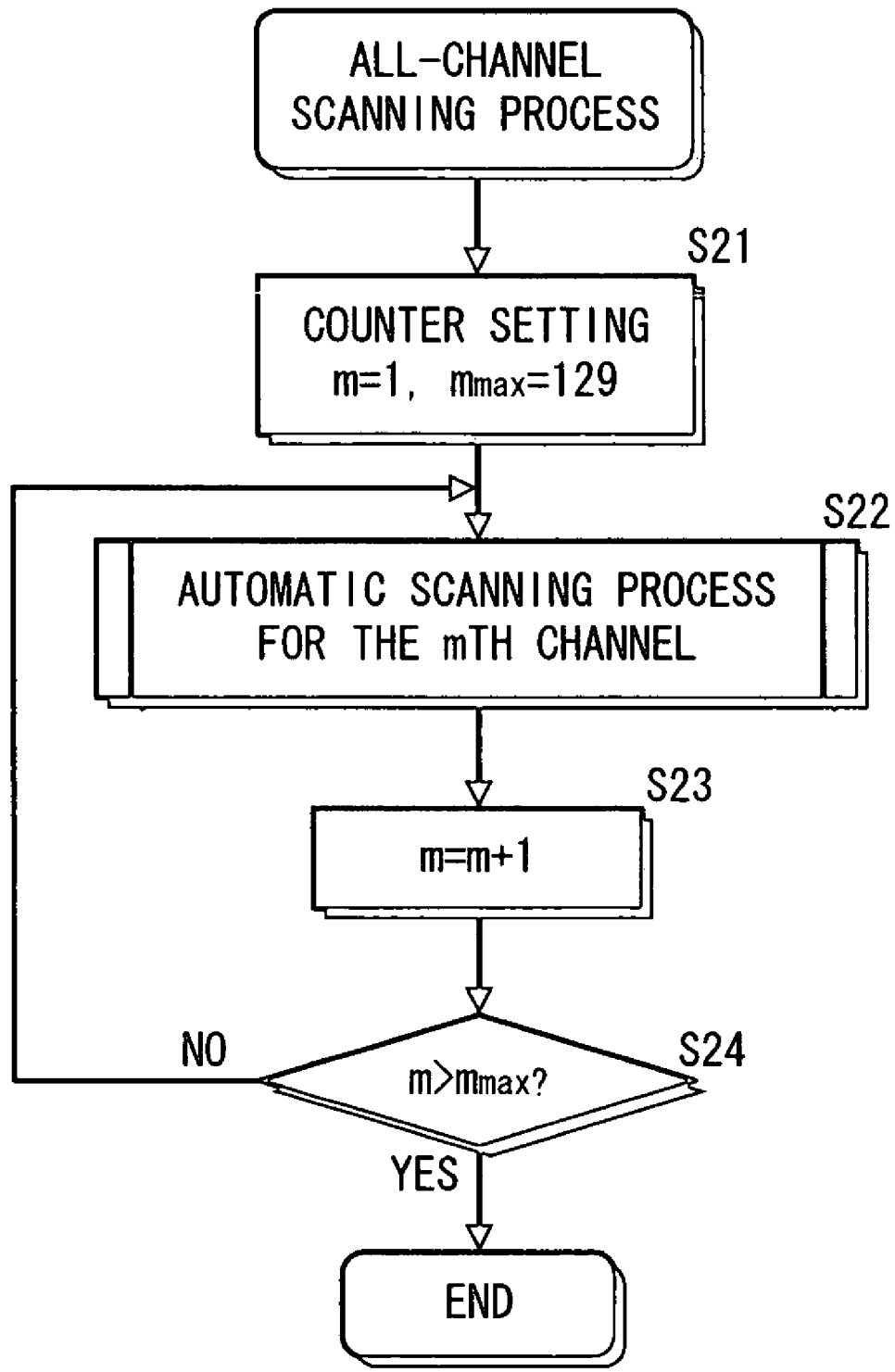
FIG. 5 is a flowchart showing an all-channel scanning process executed by the digital TV broadcast signal receiver.

Referring now to FIG. 5, description is made as to an all-channel scanning process of determining e.g. best receiving directions for all channels provided by broadcast stations. When a user selects an all-channel scanning mode, the main controller 16 sets the initial value m of a counter and the number $m_{max}$ of channels for which best receiving directions are to be determined depending on the number of channels provided by the broadcast stations (S21). Next, the main controller 16 executes the above-described automatic scanning process for the $m_{th}$ channel to determine a best receiving direction for the $m_{th}$ channel, carry out the normalization, and produce and store the bar graph in circular form (S22). The main controller 16 then increments the counter by one (S23) and determines whether or not the automatic scanning process has been carried out for all the channels (S24). When the automatic scanning process has not been carried out for all the channels yet (No at S24), the main controller 16 returns to the step S22 to execute the automatic scanning process for a next channel. When the automatic scanning process has been completed for all the channels, i.e. when the bar graph for each of the channels has been produced and stored as the antenna direction level pattern through the best receiving direction determination and the normalization (YES at S24), the process exits.

Figure 6:
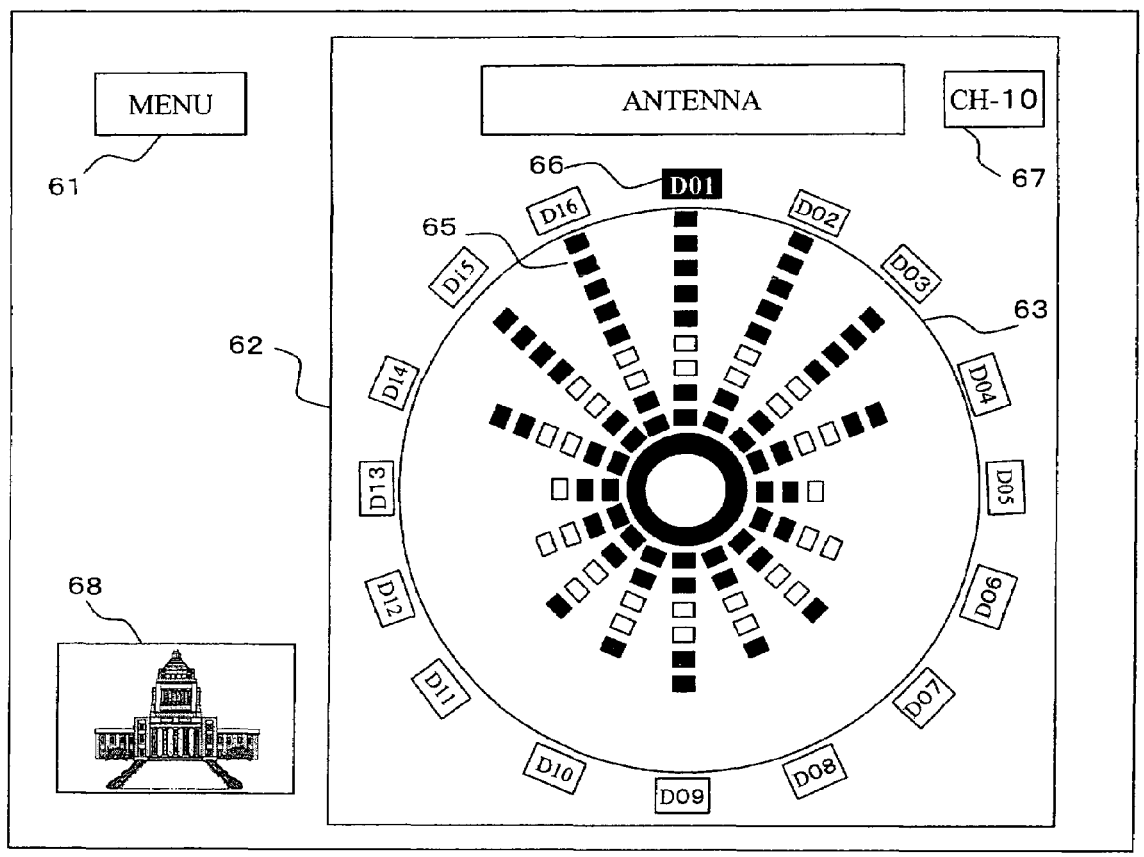
FIG. 6 is a diagram showing an antenna direction level pattern.

FIG. 6 shows an example of antenna direction level pattern produced by the all-channel scanning process described above, wherein the bar graph in which bars representing received signal strengths are arranged radially in a circle is displayed on a display screen. When channel 10 (hereinafter, abbreviated as CH-10) is being received (the channel number "CH-10" is displayed on the display screen as indicated by a reference number 67) and a user invokes the antenna direction level pattern 62 from MENU 61, the main controller 16 instructs the OSD 15 to superimpose the antenna direction level pattern 62 for CH-10, which is stored in the memory 17, on the video image on CH-10 being received for display on the display 3 screen. In FIG. 6, the direction numbers D01 to D16 corresponding to the respective receiving directions of the antenna are arranged at equal intervals at the circumference 63 of the graph. A user can select a desirable receiving direction while checking the signal levels indicated by the bars in the bar graph 65, moves a cursor 66 to one of the direction numbers D01 to D16 that corresponds to the selected receiving direction (D01 in the example shown in FIG. 6) by using left and right keys on the remote controller 18, and presses an Enter key to designate the receiving direction. In response, the main controller 16 outputs a receiving direction control signal to the control unit 21 so as to reorient the antenna.

As can be seen from FIG. 6, a video image being received can be scaled down so that the whole or part of the video image is displayed as a reduced-size picture 68. Accordingly, a user can select a desirable direction while checking the image quality of the received video image.

As described above, the digital TV broadcast signal receiver 1 according to the present invention allows a user to change the orientation of the antenna manually and freely by selecting one of the receiving directions using a remote controller while checking the antenna direction level pattern displayed on the screen that shows which direction allows high level signal reception as well as checking the image quality of a video image being received in an active receiving direction. Thereby, a user can easily select in real time a direction in which a higher quality image can be obtained. Accordingly, even when a TV image degrades during signal reception or interference signals or ghosts appear on a display screen, a user can readily select another antenna direction in which images of better quality can be obtained with less interference so as to enjoy a TV image in better condition. Further, the selectable antenna direction numbers are displayed in the circular pattern corresponding to a full turn of the antenna. In other words, the displayed antenna direction numbers correspond to the actual receiving directions of the antenna so as to be easily understandable. Thus, a user interface friendly even to a child or an elderly person can be provided that allows a user to easily control the receiver using the remote controller while viewing the screen.

Besides, a reference signal level required for normal reception is displayed concentrically in the circular pattern as described above. Accordingly, a user can compare the received signal strengths referring to the reference signal level and select a receiving direction in which the received signal strength exceeds the reference level, whereby normally received images can be obtained reliably.

The present invention has been described above using presently preferred embodiments, but those skilled in the art will appreciate that various modifications are possible. Accordingly, all such modifications are intended to be included within the spirit and scope of the present invention. For example, in the above described embodiment, the graph is produced based on the received signal strengths measured in the respective receiving directions for display. Alternatively, it is possible to produce a similar antenna direction level pattern by measuring error rates of signals received in the respective directions and carrying out normalization with respect to a minimum value of the measured error rates for display of the levels of the signals received in the respective directions.

The antenna direction level pattern is not necessarily displayed in a circle but can be displayed in a manner such that bars indicating the signal levels in the sixteen directions are aligned horizontally or vertically.

This application is based on Japanese patent application 2004-216440 filed Jul. 23, 2004, the contents of which are hereby incorporated by reference.

What is claimed is:

1. A digital television broadcast signal receiver configured to be connected to a multi-directional antenna having multiple receiving directions in conformity to a standard so as to receive television signals on a channel that are transmitted from a broadcast station by making only one of the multiple receiving directions active, the receiver comprising:

a receiving direction control signal output unit for outputting, to the multi-directional antenna, a control signal specifying a receiving direction for reception of a television signal;

a tuner configured to be connected to the multi-directional antenna for receiving a television signal;

a broadcast signal processing unit for subjecting the television signal received by the tuner to predetermined signal processing;

an image signal output unit for outputting the signal processed by the broadcast signal processing unit to a monitor;

a memory for temporarily storing the signal processed by the broadcast signal processing unit;

a receiving direction determining unit for determining a best receiving direction for each receivable channel based on the signal stored in the memory;

a signal level display unit for displaying a received signal strength based on the signal stored in the memory; and a main controller for controlling each component in the digital television broadcast signal receiver, wherein the receiving direction control signal output unit sends the control signal to the multi-directional antenna at predetermined intervals so that the multi-directional antenna is sequentially oriented in the multiple receiving directions;

wherein the tuner measures, for each channel, a strength of a television signal received in each of the multiple receiving directions in sequence and stores in the memory, for the each channel, the received signal strength measured in each of the receiving directions, a best receiving direction in which a received signal has maximum strength, and a maximum received signal strength measured in the best receiving direction;

wherein the receiving direction control signal output unit outputs a control signal specifying the best receiving direction; and wherein when a TV image degrades during signal reception or interference signals or ghosts appear on a display screen, and in response to a command from a user, the signal level display unit produces a pattern showing the received signal strength measured in each of the receiving directions that is stored in the memory and displays the produced pattern on a television screen, and the multi-directional antenna is reoriented in response to a selection from a user received from a remote controller, wherein the signal level display unit normalizes, with respect to the maximum received signal strength, the received signal strength that is measured in each of the receiving directions and stored in the memory, produces an antenna direction level pattern including a circle graph in which the normalized signal strength associated with a receiving direction number arranged at a circumference of the circle graph for representing each of the receiving directions is shown with an amplitude in a radial direction, and displays the antenna direction level pattern on the television screen, wherein the user selects one of the receiving direction numbers displayed on the television screen using the remote controller as the selection for reorienting the antenna.

2. The digital television broadcast signal receiver according to claim 1, wherein, when the pattern is superimposed on a video image of a television program being received for display, the image signal output unit causes the video image of the television program being received to be displayed as a reduced-size picture together with the pattern.

3. The digital television broadcast signal receiver according to claim 1, wherein, when the antenna direction level pattern is superimposed on a video image of a television program being received for display, the image signal output unit causes the video image of the television program being received to be displayed as a reduced-size picture together with the antenna direction level pattern.

4. The digital television broadcast signal receiver according to claim 1, wherein the signal level display unit determines a reference signal level allowing display of a received image, normalizes the reference signal level with respect to the maximum received signal strength for the each channel, and displays the normalized reference signal level concentrically on the circle graph in the antenna direction level pattern.

5. A method for digital television broadcast signal receiver connected to a multi-directional antenna having multiple receiving directions in conformity to a standard, method comprising:

controlling the multi-directional antenna at predetermined intervals to be sequentially oriented in the multiple receiving directions;

measuring, for each channel, a strength of a television signal received in each of the multiple receiving directions in sequence;

storing, for the each channel, the received signal strength measure in each of the receiving directions, a best receiving direction in which a received signal has maximum strength, and a maximum received signal strength measured in the best receiving direction; and controlling the multi-directional antenna to be oriented in the best receiving direction;

wherein when a TV image degrades during signal reception or interference signals or ghosts appear on a display screen, and in response to a command from a user, a pattern is produced showing the received signal strength measured in each of the stored receiving directions and the produced pattern is displayed on a television screen, and the multi-directional antenna is reoriented in response to a selection from a user received from a remote controller, wherein the received signal strength that is measured in each of the receiving directions is normalized with respect to the maximum received signal strength, and stored, an antenna direction level pattern is produced including a circle graph in which the normalized signal strength associated with a receiving direction number arranged at a circumference of the circle graph for representing each of the receiving directions is shown with an amplitude in a direction, and the antenna direction level pattern is displayed on the television screen, wherein the user selects on of the receiving direction numbers displayed on the television screen using the remote controller as the selection for reorienting the antenna.

6. The method of claim 5, wherein, when the pattern is superimposed on a video image of a television program being received for display, the video image of the television program being received is displayed as a reduced-size picture together with the pattern.

7. The method of claim 5, when the pattern is superimposed on a video image of a television program being received for display, the video image of the television program being received is displayed as a reduced-size picture together with the pattern.

8. The method of claim 5, wherein a reference signal level allowing display of a received image is determined, the reference signal level with respect to the maximum received signal strength for the each channel is normalized, and the normalized reference signal level is displayed concentrically on circle graph in the antenna direction level pattern.

* * * * *

UNITED STATES PATENT AND TRADEMARK OFFICE
CERTIFICATE OF CORRECTION

PATENT NO.       : 7,624,420 B2
APPLICATION NO.  : 11/187011
DATED            : November 24, 2009
INVENTOR(S)      : Tatsuo Miyagawa It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 995 days.

Signed and Sealed this

Fourteenth Day of December, 2010

David J. Kappos
*Director of the United States Patent and Trademark Office*